United States Patent [19]
Meyer

[11] 3,943,790
[45] Mar. 16, 1976

[54] MARINE OUTBOARD GEAR ASSEMBLY
[75] Inventor: James A. Meyer, Oshkosh, Wis.
[73] Assignee: Brunswick Corporation, Skokie, Ill.
[22] Filed: July 9, 1975
[21] Appl. No.: 594,538

Related U.S. Application Data
[63] Continuation-in-part of Ser. No. 499,292, Aug. 21, 1974.

[52] U.S. Cl. ............................ 74/417; 115/34 R
[51] Int. Cl.² ...................... F16H 1/14; B63H 1/14
[58] Field of Search ....... 74/417, 423; 115/35, 34 R

[56] References Cited
UNITED STATES PATENTS

| | | | |
|---|---|---|---|
| 2,284,589 | 5/1942 | Rippingille | 74/417 UX |
| 3,478,620 | 11/1969 | Shimanckas | 74/417 X |
| 3,608,684 | 9/1971 | Shimanckas | 74/417 X |

*Primary Examiner*—Leonard H. Gerin
*Attorney, Agent, or Firm*—Hopgood, Calimafde, Kalil, Blaustein, & Lieberman

[57] ABSTRACT

The invention contemplates a marine outboard gear assembly, usable in an outboard motor or an inboard-outboard drive, and featuring (a) constant drive of the meshing gears which transfer power to the propeller-shaft axis, and (b) selective spring-clutching direct to the propeller shaft, thereby (c) utilizing the meshing gears for lubricant circulation as long as the engine is operating and whether or not the clutch is engaged and (d) reducing to an absolute minimum the drag and inertial effects operative upon the propeller shaft when the boat is moving in the declutched condition, i.e., propeller windmilling. Also featured is a particular subassembly of gear and clutch parts on the propeller shaft whereby desired axial clearance can be readily pre-adjusted and selected, prior to assembly to the gear case.

14 Claims, 2 Drawing Figures

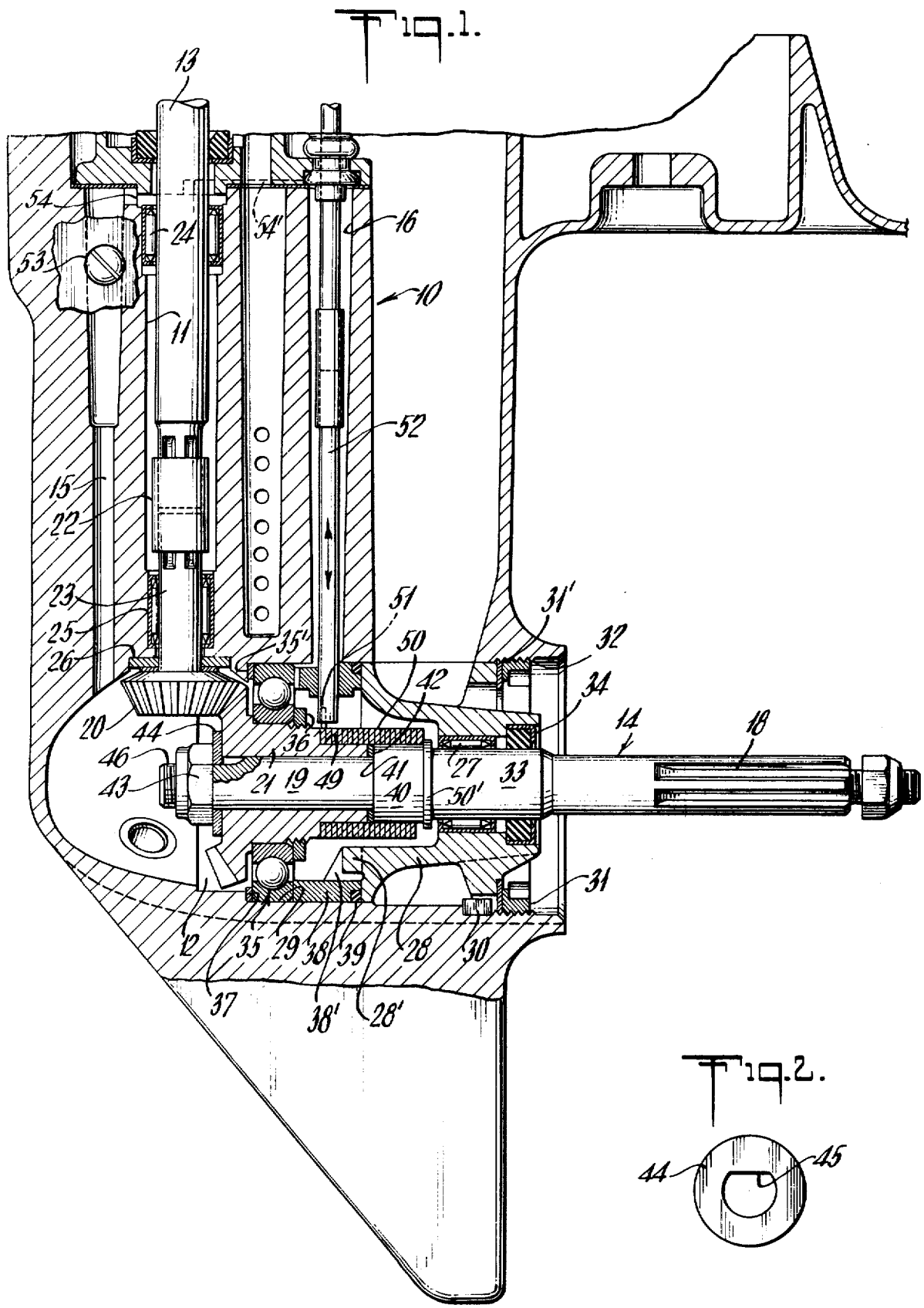

MARINE OUTBOARD GEAR ASSEMBLY

This application is a continuation-in-part of my co-pending application, Ser. No. 499,292, filed August 21, 1974.

This invention relates to the construction of marine outboard drive gear and has particular utility in smaller sizes of outboard motors, although the principles of the invention are also applicable to larger-size outboards and to inboard-outboard drive units.

It is an object of the invention to provide an improved construction of the character indicated.

Another object is to provide improved lubrication for the complete drive train of a marine outboard assembly of the character indicated, regardless of the engaged or disengaged condition of the drive and as long as the engine is operating.

It is a specific object to provide a construction of the character indicated, wherein axial clearances of parts carried by the propeller shaft can be readily preselected and adjusted.

A further specific object is to meet the above objects with a construction in which the location of clutched engagement of engine output to the propeller shaft is at the propeller shaft itself.

A general object is to meet the indicated objects with a construction of relative simplicity, reliability of operation, ease of maintenance and low cost, and offering minimum drag resistance to propeller rotation when in unclutched condition.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 1 is a vertical sectional view through most of the gear-case assembly portion of an outboard marine drive assembly of the invention; and FIG. 2 is a plan view of a keyed part of the assembly of FIG. 1.

The invention is shown in application to an assembly comprising a gear case 10 having intersecting bores 11–12 on vertical and horizontal axes for rotary accommodation of an upstanding drive shaft 13 and of a propeller shaft 14. The gear case 10 includes various other upstanding passages such as a lubricant passage 15 and a control-element passage 16, and the lower end of the case includes a fin or skid formation 17 for bottom protection of the blade sweep of the propeller (not shown) carried at the splined outer projecting end 18 of shaft 14.

A beveled drive gear 20 at the lower end of shaft 13 is in constant mesh with a beveled driven gear 21 which is rotatable on or with respect to a reduced cylindrical surface 19 near the inner end of the propeller shaft 14. As shown, a splined coupling 22 unites adjacent ends of the drive shaft 13 and of the stub-shaft portion 23 of gear 20; spaced needle-roller assemblies 24–25 establish their concentric rotary support in the bore 11, and a thrust washer 26 axially locates gear 20 to the gear-case casting.

Axially spaced points of bearing support are also provided for the propeller shaft 14. A first of these points is at a needle-roller assembly 27 fitted to the bore of an annular plate member or bearing carrier 28, which is shown to have an inner circular base flange fitted to a counterbore portion 29 in the propeller-shaft bore 12; an outer circular flange of the carrier 28 is also supported in a counterbore portion of the propeller-shaft bore 12, being keyed by means 30 against rotation therein. A clamp ring 31 has threaded engagement to the threaded outer end 32 of the counterbore and retains the assembly, as will later be more fully explained. Needle-roller means 27 ride a central cylindrical surface 33 of shaft 14, and seal means 34 fitted to the carrier 28 also engages surface 33.

The second point of propeller-shaft support is provided by antifriction-bearing means 35, shown as a large ball-bearing assembly with inner and outer race rings and having combined radial and thrust load capability. Bearing 35 directly supports the driven gear 21, and the reduced cylindrical surface 19 of shaft 14 is rotatably positioned by the bore of gear 21. As shown, a threaded nut or ring 36 secures the inner ring of bearing 35 against a shoulder on gear 21, and the outer ring of bearing 35 is supported in and by counterbore 29, being driven against a shim 35' and the radial shoulder 37 at which counterbore 29 ends; axial location against shoulder 37 is applied by clamp ring 31, via a stainless steel thrust washer 31' the bearing carrier 28, a spacer ring 38 and the outer ring of bearing 35; and a resilient O-ring seal 39 carried at a relieved end of ring 38 completes the sealed integrity of the inner volume and contents of the gear case 10. A local axial projection 28' of carrier 28 into the limited angular space between two locating lugs 38' on the spacer ring 38 assures keyed orientation of ring 38 with respect to the casing, via key means 30, to provide alignment of the shift shaft 52 with its passage through ring 38 as illustrated.

A larger-radius cylindrical shaft portion 40, between surfaces 19 and 33, establishes a shoulder 41 which serves one direction of axial location of the shaft 14. A thrust washer 42 may be interposed between gear 21 and shoulder 41 to keep the turns of spring 50 clear, but is not essential as the propeller shaft 14 will always be driven forward by thrust of the propeller when clutch 50 is engaged. The inner axial end of shaft 14 is threaded to accept stop-nut means 43 and its adjustment against a washer 44 for axially limiting the other direction of motion of the shaft 14. Washer 44 (see FIG. 2) is formed for keyed relation to shaft 14, being shown with a chordal flat 45 in its bore, to match a local milled flat 46 at the inner end of shaft 14. The clearance between the shoulder 41 and gear 21 is adjusted by the setting of stop-nut 43 to prevent wrap down of the spring coil 50 between gear 21 and shoulder 41.

To complete the description, and as a feature of the invention, clutch means carried on the propeller-shaft axis provides for selective engagement and disengagement of the entire drive train with respect to the ultimately driven element, namely the propeller-shaft itself. As shown, and preferably at least for smaller-size outboard-motor applications, such clutch means is of the coil-spring variety, as shown for example and described for a different environment in Armstrong U.S. Pat. No. 2,760,613. Such a clutch involves close multiple turns of spring stock, preferably of rectangular section and overlapping adjacent matching cylindrical surfaces, i.e., of the same radius, on the parts to be selectively engaged. In the form shown, the hub end of gear 21 is reduced to establish a cylindrical surface 49 of radius matching that of shaft surface 40, and a helical coil spring 50 overlaps both these surfaces. Spring 50 is located between a shaft bead or shoulder 50' and the shoulder defined by forming the reduced surface 49, and, consistent with the description in said patent, one end of spring 50 is outwardly bent from the helix (e.g., tangential to the path of the helix) to define a toe 51 the rotary sweep of toe 51 upon driven rotation is in the path of selective axial movement of a control element or rod 52 (in passage 16), remotely actuable by means not shown. In its retracted position, rod 52 clears the path of driven movement of toe 51 and the clutch remains engaged, thus locking gear 21 to the propeller shaft 14, for driving the boat; in its downwardly projected position, rod 52 intercepts toe 51 to relieve all clamping action of spring 50 on the surface 49, thereby disengaging shaft 14 from the entire drive mechanism. It will be understood that the toe 51 is so formed as to harmlessly escape rod 52 in the event of a reverse-drive rotation which may accompany a backfire or kick-back of the engine, all as explained in said patent.

The described construction will be seen to have achieved all stated objects in a particularly effective manner. As to lubrication, the meshing gears 20–21 are caused to run as long as the engine is operating, and regardless of the engaged or disengaged condition of the clutch means 50; the gear case will have been filled with lubricant, to the level of the conventional filler port and plug 53, and so the constant running of gears 20–21 will mean continued circulation of lubricant at all times, as for example upward in bore 15, through the opening 54 and down the remnant passage space within bore 11. A passage 54' between bores 11 and 16 completes a vent line between bores 11, 15 and 16 which prevents the trapping of air when oil is added or changed.

The keying of washer 44 to the propeller shaft 14 means that no relative rotation of gear 21 on shaft 14 can ever be the cause of losing the preselected setting of stop-nut means 43 on shaft 14. Moreover, the relation of gear 21, bearing 35, and clutch 50 on shaft 14 means that they together constitute a unit-handling subassembly, readily accessible for servicing and adjustment when bodily removed from the gear case; unthreading release of ring 31 enables simple removal of carrier 28, key 30, and spacer 38, along with and without disturbing the unit-handling integrity of this subassembly. Furthermore, upon their reassembly to the gear case, key 30 assures correct angular registry, and shoulder 37 assures correct axial positioning for the meshing gears 20–21. No amount of clamping force via ring 31 can upset or impair these relationships; neither can a particular preselected axial-gap, clearance, or preload via nut means 43 be affected by such clamping. Thus, for example, for a 4-hp application, a 40 ft.-lb. torque is recommended for the clamped application of ring 31; while stop-nut 43 is adjusted to provide a clearance of between 0.010 (0.254 mm) and 0.015 inch (0.381mm) between the shoulder 41 and the adjacent end of gear 21.

While the invention has been described in detail for the preferred embodiment, it will be understood that modifications may be made without departure from the scope of the invention.

What is claimed is:

1. A marine outboard gear assembly, comprising a gear case having an upstanding drive bore with a drive shaft mounted for rotation therein, the lower end of said case having a propeller-shaft bore communicating with the lower end of the drive bore and open to the rear of said case, a propeller shaft and means supporting the same for rotation in the propeller-shaft bore and otherwise closing the open end of the propeller-shaft bore, meshing drive and driven gears on said respective shafts, said drive gear being fixed to said drive shaft and said driven gear being rotatably overlapped and axially captive with respect to a portion of said propeller shaft, and one-way-engaging clutch means coacting between said driven gear and said propeller shaft, said clutch means including selectively operable means for effectively enabling and disabling the one-way-engageability thereof, whereby said meshing gears are both driven as long as said drive shaft is driven, and whereby essentially only said driven shaft rotates when the propeller is "windmilling."

2. The gear assembly of claim 1, in which said gear case has lubrication passages communicating with the region of intersection of said bores and serving the drive-shaft mounting, whereby lubricant circulation is available from gear-mesh action as long as said drive shaft is driven and regardless of the clutched or unclutched condition of the propeller shaft.

3. The gear assembly of claim 1, in which a bearing directly and rotatably supports said driven gear with respect to the propeller-shaft bore at a location of driven-gear overlap with said propeller shaft, said location being axially inwardly spaced from the end-closing location of propeller-shaft support in the bore.

4. The gear assembly of claim 3, in which said clutch means is disposed between said locations.

5. The gear assembly of claim 3, in which said bearing is an antifriction bearing having combined thrust and radial load capability.

6. The gear assembly of claim 5, in which said bearing is a ball bearing.

7. The gear assembly of claim 1, in which said case includes a control-element passage, and remotely operable control means for selectively operating said clutch means via the control-element passage.

8. The gear assembly of claim 1, in which the axially inner portion of said propeller shaft is characterized by a cylindrical surface for the rotatable mounting of said driven gear, and axial-retention means rotatable only with said propeller shaft and positioned to directly contact and axially locate said shaft with respect to said driven gear, said axial-retention means including at the inner end of said propeller shaft a removable element having keyed relation to said propeller shaft.

9. The gear assembly of claim 8, in which the inner end of said propeller shaft is threaded, said axial-retention means including a nut for adjustably positioning said keyed removable element.

10. The gear assembly of claim 1, in which the axially inner portion of said propeller shaft is characterized by a reduced cylindrical surface between a radial shoulder and a threaded end, said driven gear having a bore rotatable on said cylindrical surface and being retained at one end by said shoulder, a removable retaining ring on the threaded end of said propeller shaft for direct retaining contact with the other axial end of said driven gear, and adjustable nut means on said threaded end for selectively positioning said retaining ring, said retaining ring having a keyed relation to said propeller shaft, whereby relative rotation of said propeller shaft and driven gear cannot disturb the adjustment of said nut means.

11. The gear assembly of claim 1, in which the axially inner portion of said propeller shaft is characterized by a reduced cylindrical surface between a radial shoulder and the inner end of the propeller shaft, removable means carried by said inner end for retaining said driven gear for rotation on said cylindrical surface, regions of said driven gear and of said propeller shaft adjacent said shoulder being characterized by cylindrical surfaces of substantially the same radius, said radius being larger than that of said reduced cylindrical surface, and said clutch means being of the coiled-spring variety and in axial overlap with both said larger-radius surfaces.

12. The gear assembly of claim 11, and including a thrust washer carried by said reduced cylindrical surface and axially interposed between said shoulder and said driven gear.

13. The gear assembly of claim 1, in which the propeller-shaft bore includes a cylindrical counterbore defining a radial shoulder in the axial region of gear meshing, a unit-handling antifriction bearing of combined radial and thrust load capability and having inner and outer ring spaced by antifriction elements for supporting said driven gear in said counterbore with said outer ring positioned by said shoulder, said propeller shaft and said driven gear and said clutch means and said antifriction bearing constituting a unit-handling subassembly selectively enterable into the propeller-shaft bore for support of said driven gear in desired meshing engagement with said dirve gear when the inner axial end of said outer bearing ring is counterbore-located by said shoulder; said means supporting said propeller shaft and closing the propeller-shaft bore comprising a removable annular member supported by said counterbore and in axial-positioning relation to the outer axial end of said outer bearing ring; whereby a subassembly comprising said propeller shaft, said driven gear, said antifriction bearing, and said clutch may be removed as a unit with said removable annular member.

14. The gear assembly of claim 13, and means including a clamp ring threadedly engaged to the outer end of the counterbore for applying axial clamp force to said annular member and to said antifriction bearing against said shoulder.

* * * * *